A. A. GOLDBLATT.
ALARM DEVICE FOR AUTOMOBILES.
APPLICATION FILED FEB. 19, 1919.
1,327,993.
Patented Jan. 13, 1920.
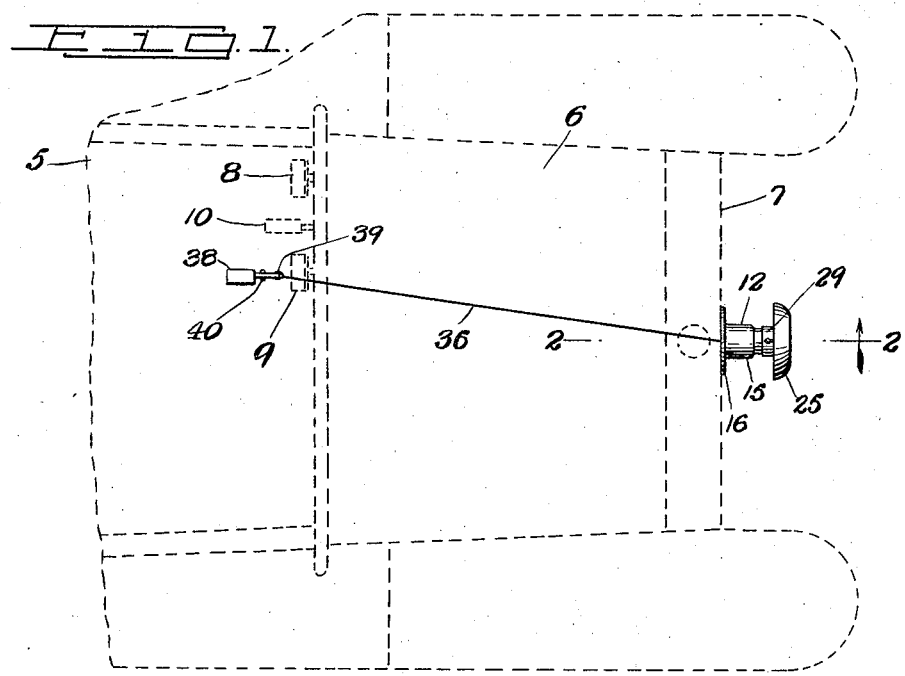
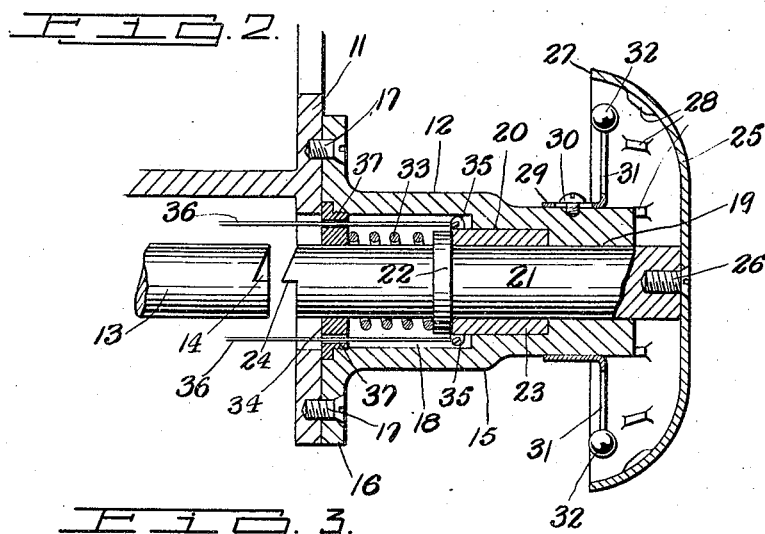
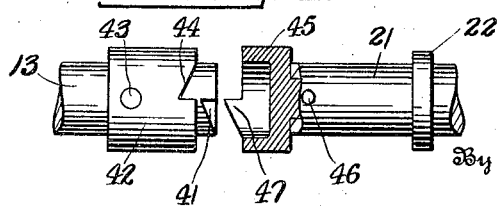
Inventor
Albert A. Goldblatt,
By his Attorneys
Edgar Tate & Co.

UNITED STATES PATENT OFFICE.

ALBERT A. GOLDBLATT, OF BROOKLYN, NEW YORK.

ALARM DEVICE FOR AUTOMOBILES.

1,327,993.            Specification of Letters Patent.        Patented Jan. 13, 1920.

Application filed February 19, 1919. Serial No. 278,036.

*To all whom it may concern:*

Be it known that I, ALBERT A. GOLDBLATT, a citizen of the United States, and residing at Brooklyn, in the county of Kings and State of New York, have invented certain new and useful Improvements in Alarm Devices for Automobiles, of which the following is a specification, such as will enable those skilled in the art to which it appertains to make and use the same.

This invention relates to alarm or signal devices and particularly to devices of this class designed for use in connection with power driven vehicles, and the object of this invention is to provide vehicles of the class specified with an alarm or signal device which is operated by the motor of the vehicle or the crank shaft of such motor whenever desired, the alarm or signal device being normally held in an inoperative position and being mechanically moved into operative position by the operator of the vehicle; and a further object of the invention being to provide a device of the class and for the purpose specified which is simple in construction and operation and efficient in use.

The invention is fully disclosed in the following specification, of which the accompanying drawing forms a part, in which the separate parts of my improvement are designated by suitable reference characters in each of the views, and in which:

Figure 1 is a diagrammatic plan view of the front end portion of a power driven vehicle and illustrating the method of connecting my improved alarm or signal device therewith;

Fig. 2 a section on the line 2—2 of Fig. 1 on an enlarged scale and indicating the parts in their normal position; and, Fig. 3 a view similar to Fig. 2 but showing only a part of the construction and showing a modification.

In Fig. 1 of the drawing I have indicated at 5 the front end portion of an automobile or similar power driven vehicle comprising an engine hood 6, a radiator 7, clutch pedal 8, brake pedal 9 and a fuel control pedal 10.

In Fig. 2 of the drawing I have indicated at 11 the bottom portion of the radiator frame or support in connection with which my alarm or signal device 12 is mounted and at 13 in Fig. 2 I have shown the protruding end of the crank shaft of the engine of the vehicle, the face of which is provided with notches or recesses 14, one of which is shown in Fig. 2.

My improved alarm or signal device 12 consists of a cylindrical casing 15 provided at its inner end with an enlarged flange portion 16 through which are passed screws 17 for securing the device to the frame 11 and the inner portion of the cylindrical casing is provided with a large bore 18, while the opposite end of the casing is provided with a smaller bore 19, and the bores 18 and 19 are joined by an intermediate bore 20 larger than the bore 19 but smaller than the bore 18.

In practice a shaft 21 provided approximately centrally thereof with an enlarged flange 22 is mounted in the bore 19 of the casing 15 and a sleeve 23 is mounted on said shaft outwardly of the flange 22 and operating in the bore 20. The inner end of the shaft 21 is provided with a plurality of teeth or projections 24, one of which is shown, said teeth or projections operating in connection with the recesses 14, in the end of the crank shaft 13. A cup-shaped bell or other sound producing member 25 is secured centrally to the outer end of the shaft 21 as shown at 26, and the inner wall thereof is provided inwardly of the rear edge 27 with a plurality of spaced projecting members 28.

A sleeve 29 is mounted for adjustment longitudinally of the casing 15 as shown at 30 and provided at its outer edge with a plurality of radial spring arms 31 provided at their free ends with enlarged heads 32 which are adapted to operate in connection with the spaced projecting members 28 in the bell 25.

A spiral spring 33 is mounted on the shaft 21 inwardly of the flange 22 and within the bore 18 of the casing 15 and held in said bore by a detachable cap 34 mounted in the inner end portion of the bore 18. The sleeve 23 is provided on the periphery of the inner end portion thereof with a plurality of projecting ears 35 with which are connected operating rods or wires 36 which pass inwardly through the bore 18 and through apertures 37 in the cap 34, and these wires extend backwardly and are connected with a pedal device 38 as shown at 39, said pedal device being pivoted at 40.

In the operation of my improved alarm or signal device, the construction of which is above set out, the foot pedal 38 is pushed forwardly to draw the rods or wires 36 inwardly, which operation moves the sleeve 23 inwardly as well as the shaft 21 to bring the projecting members 24 on the inner end of the shaft 21 into engagement with the recesses 14 on the protruding end of the crank shaft 13, and if the motor or crank shaft is in operation the shaft 21 will be rotated by the crank shaft 13, which operation will rotate the bell 25 over the heads 32 on the ends of the radial spring arms 31 and an alarm or signal will be sounded. When it is desired to cease the operation of the alarm or signal device 12 the foot pedal 38 is released and the spring 33 will move the shaft 21 and sleeve 23 outwardly into the position shown in Fig. 2, which operation also moves the bell 25, or the projecting members 28 thereof out of engagement with the heads 32 on the arms 31.

In Fig. 3 of the drawing I have shown a slight modification which facilitates the connection or attachment of my improved alarm or signal device 12 to power driven vehicles as now constructed, or with the present construction of the protruding end of the crank shaft and as shown in Fig. 3 the crank shaft 13 is usually provided with recesses 41 arranged or cut therein in the manner shown in said figure, and in this event I employ a supplemental collar 42 secured to the protruding end of the crank shaft by a pin or bolt 43, and this collar is provided on its outer edge with a plurality of recesses 44. In this form of construction the inner end of the shaft 21 is provided with an enlarged sleeve portion 45 which is detachably connected with said end of the shaft 21 by a pin 46, and the inner edge portion of the sleeve 45 is provided with a plurality of projecting members 47, one of which is shown, and which operate in connection with the recesses 44 in the collar 42 in the same manner as the operation of the projecting members 24 in connection with the recesses 44 as shown in Fig. 2.

It will be understood that while I have shown two forms of construction for carrying my invention into effect, I am not limited thereto, nor to the details of the construction thereof, and various changes in and modifications of the details of construction herein shown and described may be made, within the scope of the appended claims, without departing from the spirit of my invention or sacrificing its advantages.

Having fully described my invention, what I claim as new and desire to secure by Letters Patent, is:—

1. In a signal device of the class described, a stationary sleeve member, a shaft rotatably mounted in said sleeve member and protruding through one end thereof, a sound producing member mounted on the protruding end of the shaft and adapted to rotate therewith, means involving a tensional device for holding said shaft and sound producing member in a predetermined position relative to said sleeve member, and hammer devices mounted on said sleeve member and adapted to operate in connection with said sound producing member.

2. In a signal device of the class described, a stationary sleeve member, a shaft mounted in said sleeve member and protruding through one end thereof, a sound producing member mounted on the protruding end of the shaft and adapted to be rotated thereby, hammer devices mounted on said sleeve member and adapted to operate in connection with said sound producing member in one position thereof, and means involving a tensional device for holding said sound producing member out of engagement with said devices.

3. In a signal device of the class described, a sleeve member, a shaft mounted in said sleeve member and protruding through one end thereof, a sound producing member mounted on the protruding end of the shaft, devices mounted on the outer end portion of said sleeve member and adapted to operate in connection with said sound producing member in one position thereof, means involving a tensional device for holding said sound producing member out of engagement with said devices, and means whereby said sound producing means will be moved into engagement with said devices and be rotated through said shaft.

4. In a signal device for power driven vehicles, a sleeve member mounted in connection with a vehicle, a shaft rotatably mounted in said sleeve member and protruding through one end thereof, a sound producing member mounted on the protruding end of said shaft, hammer devices mounted on said sleeve member and adapted to operate in connection with said sound producing member, tensional means for holding said sound producing member normally out of engagement with said hammer devices, and means for moving said shaft into engagement with a rotary member of the vehicle and to bring said sound producing member in connection with said hammer devices.

5. The combination with the crank shaft of a power unit of power driven vehicles, of a signal device comprising a sleeve member mounted in juxtaposition to said crank shaft, a shaft rotatably mounted in said sleeve member and one end of which is adapted to operate in connection with the crank shaft and the other end of which protrudes beyond said sleeve member, a sound producing member mounted on the protruding end of said shaft, resilient hammer devices mounted on said sleeve member and adapted to operate in connection with said sound producing member, and means involving a tensional device for normally holding said shaft out of engagement with the crank shaft of a vehicle, and said sound producing member out of engagement with said resilient hammer devices.

6. The combination with the crank shaft of a power unit of power driven vehicles, of a sleeve mounted on the free end of said shaft, a sleeve secured to the vehicle in front of said crank shaft, a shaft rotatably mounted in said sleeve, one end of said shaft being provided with an enlarged tubular head adapted to operate in connection with the sleeve on the crank shaft, the other end of said shaft protruding beyond said sleeve, a sound member mounted on the protruding end of said shaft, adjustable hammer devices mounted on said sleeve and adapted to operate in connection with said sound member, and a spiral spring mounted on the inner end portion of said shaft and adapted to normally hold said shaft out of engagement with said crank shaft and said sound member out of engagement with said hammer devices.

7. The combination with the crank shaft of a power unit of power driven vehicles, of a sleeve mounted on the free end of said shaft, a sleeve secured to the vehicle in front of said crank shaft, a shaft rotatably mounted in said sleeve, one end of said shaft being provided with an enlarged tubular head adapted to operate in connection with the sleeve on the crank shaft, the other end of said shaft protruding beyond said sleeve, a sound member mounted on the protruding end of said shaft, adjustable hammer devices mounted on said sleeve and adapted to operate in connection with said sound member, a spiral spring mounted on the inner end portion of said shaft and adapted to normally hold said shaft out of engagement with said crank shaft and said sound member out of engagement with said hammer devices, a supplemental sleeve mounted on the outer end of the shaft and operating in connection therewith, and means connected with said sleeve whereby the same may be operated to move said shaft into engagement with the crank shaft and said sound member into engagement with said hammer devices.

In testimony that I claim the foregoing as my invention I have signed my name, in presence of the subscribing witnesses, this 15th day of February, 1919.

ALBERT A. GOLDBLATT.

Witnesses:
C. E. MULREANY,
H. E. THOMPSON.